(12) United States Patent
Neuwirth

(10) Patent No.: US 8,763,813 B2
(45) Date of Patent: Jul. 1, 2014

(54) APPARATUS FOR THE TRANSPORT AND SORTING OF LOOSE MATERIALS

(75) Inventor: Jiri Neuwirth, Zlin (CZ)

(73) Assignee: RMAX S.R.O., Zlin, Louky (CS)

( * ) Notice: Subject to any disclaimer, the term of this patent is extended or adjusted under 35 U.S.C. 154(b) by 78 days.

(21) Appl. No.: 13/343,710

(22) Filed: Jan. 5, 2012

(65) Prior Publication Data

US 2012/0168355 A1    Jul. 5, 2012

(30) Foreign Application Priority Data

Jan. 5, 2011   (CZ) ........................................ 2011-2

(51) Int. Cl.
  *B07B 13/16*   (2006.01)
  *B03B 11/00*   (2006.01)
  *B24C 9/00*    (2006.01)
  *B03B 9/00*    (2006.01)

(52) U.S. Cl.
  CPC . *B03B 9/00* (2013.01); *B03B 11/00* (2013.01); *B07B 13/16* (2013.01); *B24C 9/003* (2013.01); *B24C 9/006* (2013.01)
  USPC ...................................................... 209/247

(58) Field of Classification Search
  CPC ..................................................... B07B 13/16
  USPC .......... 198/578, 601, 610, 614; 209/241, 242, 209/247, 257, 261
  See application file for complete search history.

(56) References Cited

U.S. PATENT DOCUMENTS

| | | | | |
|---|---|---|---|---|
| 5,575,427 A | * | 11/1996 | Karpisek ......................... | 241/30 |
| 5,577,618 A | * | 11/1996 | Rafferty ........................ | 209/421 |
| 2003/0146315 A1 | * | 8/2003 | Boast ........................ | 241/101.72 |
| 2005/0040015 A1 | * | 2/2005 | Schlegel et al. ............... | 198/519 |
| 2010/0193618 A1 | * | 8/2010 | Lewis-Gray ..................... | 241/77 |
| 2011/0073529 A1 | * | 3/2011 | Sprouse et al. ................... | 209/3 |
| 2012/0138426 A1 | * | 6/2012 | Cruz ............................. | 198/509 |
| 2013/0000933 A1 | * | 1/2013 | Neuwirth .......................... | 173/1 |

FOREIGN PATENT DOCUMENTS

EP           2474361 A2  *  7/2012

* cited by examiner

*Primary Examiner* — Jeremy R Severson
(74) *Attorney, Agent, or Firm* — Oppedahl Patent Law Firm LLC

(57) ABSTRACT

A rake conveyor comprises a horizontal movable part and a rotating-swinging part and/or an inclined part. A screen is located above part of the rake conveyor. The rotating-swinging part and/or the inclined part of the rake conveyor is followed by a first bucket conveyor or the a part of the dual bucket conveyor, which lifts the used loose material into equipment for sorting of loose material. At least one of the outputs of equipment for sorting of loose materials is followed by a second bucket conveyor or by a second part of the dual bucket conveyor. The outlet of the second bucket conveyor or the second outlet of the dual bucket conveyor leads to a silo, which is additionally equipped with an outlet mouth, leading into a container. Once used abrasive material has accumulated, the excess abrasive material is taken out of the container above the rack conveyor.

21 Claims, 5 Drawing Sheets

APPARATUS FOR THE TRANSPORT AND SORTING OF LOOSE MATERIALS

TECHNICAL FIELD

This invention concerns an apparatus for the transport and sorting of loose materials, especially abrasives in manufacturing operations in which the surfaces of products are cleaned or ground—metal castings, for example. The invention solves the need for removal of already used and soiled abrasive material from the work place, the removal of impurities from the used abrasive materials, and the preparation of the cleaned abrasive material for re-use, all while maintaining a structural height of the apparatus that is as low as possible, and with minimal installation requirements.

BACKGROUND

Some manufacturing plants use loose abrasive materials for cleaning and grinding the surfaces of semi-finished products such as metal castings. Floor conveyors, worm conveyors, vibration conveyors, bucket elevators and integrated cleaning equipment, connected to containers, are used for the collection and sorting of such loose materials. The most common type of floor conveyor used is a rake conveyor with a horizontal plane surface which rakes with reciprocal movement above the horizontal surface; the rakes are attached to a supporting frame, which reciprocates in the horizontal direction. The driving units of known rake conveyors are located on the plane of the equipment. The workplace floor is located above the rake conveyors, and the floor consists of a supporting grate with mesh size of around 35×35 mm.

The disadvantage of these rake conveyors is that the abrasive material is either not actively removed from the places where the driving units are located, or the drives are located in rooms adjacent to the workplace, which increases space requirements. Other disadvantages of the existing systems are the difficult installation of rake conveyors using several drives and the fact that with the equipment described above, some small parts that are long and thin may fall through the supporting grate. This leads to parts accumulating on the floor of the workplace, e.g. screws or pieces of wire which may get stuck and cause the rake conveyor to fail.

Other existing systems contain two perpendicular conveyors that work on two planes (called a "lengthwise conveyor" and a "cross conveyor"), or in rare cases on one plane. A lengthwise conveyor is usually located above the cross conveyor, and the cross conveyor transports the loose material into a bucket conveyor outside the workplace. The disadvantages of these systems are the decreased load capacity of the floor at places where the conveyors cross and the unequal footing depth and increased costs for the construction of the foundation.

Worm conveyors are also utilized for horizontal transportation. The disadvantage of these conveyors is the difficult extension of worms to lengths exceeding 6 m, as the worms tend to sag at longer lengths. Another disadvantage of worm conveyors is doubled energy consumption in comparison to rack conveyors and the more expensive structural preparation of the floor.

Vertical bucket conveyors are typically connected to horizontal conveyors. The disadvantage of the connection to rack conveyors with a horizontal underlay surface is that when the bucket conveyor is connected to a rack conveyor at the same level, some spaces can occur from which the abrasives cannot be taken up by the bucket conveyor. On the other hand, a design in which the bucket conveyor is connected at a level lower than the rack conveyor requires other structural adaptations.

Vibration conveyors are also utilized for horizontal transportation. Their disadvantage that the building has to be tall to accommodate such a conveyor, which is unfavourable especially at long distances.

The bucket conveyors used in the past in air blasting are exclusively a single-row type. The use of a single-row type of bucket conveyor requires a large transportation height because of the column arrangement of the following equipment such as cleaners, silos, blasting equipment, etc. In such cases, the total height of the conveyors is about 3 m higher than in the system of the invention, and their structure sometimes reaches into the higher floors of the building or even above the roof structure. Another disadvantage is the necessity of installing the lower part of the bucket conveyor under the floor level. Because the belt is long, it stretches, which requires more frequent checking and tightening of the belt.

Double-row bucket conveyors are known from the design of sweeping machines, where it is used for connecting the input and output worm conveyors with the integrated cleaning apparatus for abrasives. The disadvantage of this design is that it cannot be used in workplaces where the large-area collection of abrasives is required in connection with blasting by pressurised air.

SUMMARY OF THE INVENTION

The disadvantages mentioned above are solved by an apparatus for transport and sorting of loose materials, consisting of a rack conveyor with a horizontal moveable part connected to a linear drive, and equipment for the sorting of loose material. The essence of this invention is that the rake conveyor further comprises an additional rotating-swinging part and/or a diagonal part. The apparatus also comprises a first bucket conveyor, which is located between the rotating-swinging part and/or the diagonal part of the rake conveyor and the equipment for sorting of loose materials. At least one of the outputs of the equipment for sorting of loose material is alternatively followed by a second bucket conveyor. According to another alternative, the driving wheels of the first and second bucket conveyors are arranged on one common driving shaft. Under other alternatives at least one of two or more screens is located above at least part of the rake conveyor, or the linear drive of the horizontal movable part of the rake conveyor is located above the horizontal movable part of the rake conveyor. In another alternative the second bucket conveyor and the first bucket conveyor together create a dual bucket conveyor. The buckets of the dual bucket conveyor can be arranged in two parallel rows on one common belt. The apparatus can also involve a silo, which can be advantageously located next to the equipment for sorting of loose material and in the process the second bucket conveyor or the dual bucket conveyor is equipped with an outlet for connecting to the silo. According to another alternative, the apparatus is further equipped with a container. In the process the silo is equipped with an outlet mouth leading into the container and the container has an outlet, which leads into the output of the first bucket conveyor or into the first input of the dual conveyor or the outlet of the container leads above the rake conveyor. The outlet of the container can advantageously lead above the rotating-swinging part or above the inclined part.

An advantage of the apparatus according to this invention is low structural height and minimal requirements for excavation. Another advantage is the possibility to use more than one driving unit, offering longitudinal adjustment of the rake strips without any limitation of their total length. Another advantage of the apparatus is its low failure rate. If the apparatus is used for the collection and cleaning of abrasives, the collected abrasive material is pre-cleaned before being discharged to the rake conveyor. Another advantage is that the rake conveyor rakes through its entire area, which is enabled by the arrangement of driving units located above the rake frame; the active flights also rake the area under the drives located inside of the workplace. The area taken up by the rake conveyors does not exceed the area from which the loose material is being collected. An advantage of the use of the container is that the silo does not need to be large or, above all, high, even in the case where a very uneven operation is expected; as such, the arrangement ensures a low structural height. In the case of uneven operation, the passage of the abrasive material through the apparatus becomes more even, as the immediate excess amount of abrasives is returned back in front of the input into the equipment for cleaning the abrasives.

DETAILED DESCRIPTION OF EXEMPLARY EMBODIMENTS

Example 1

Figure 1:
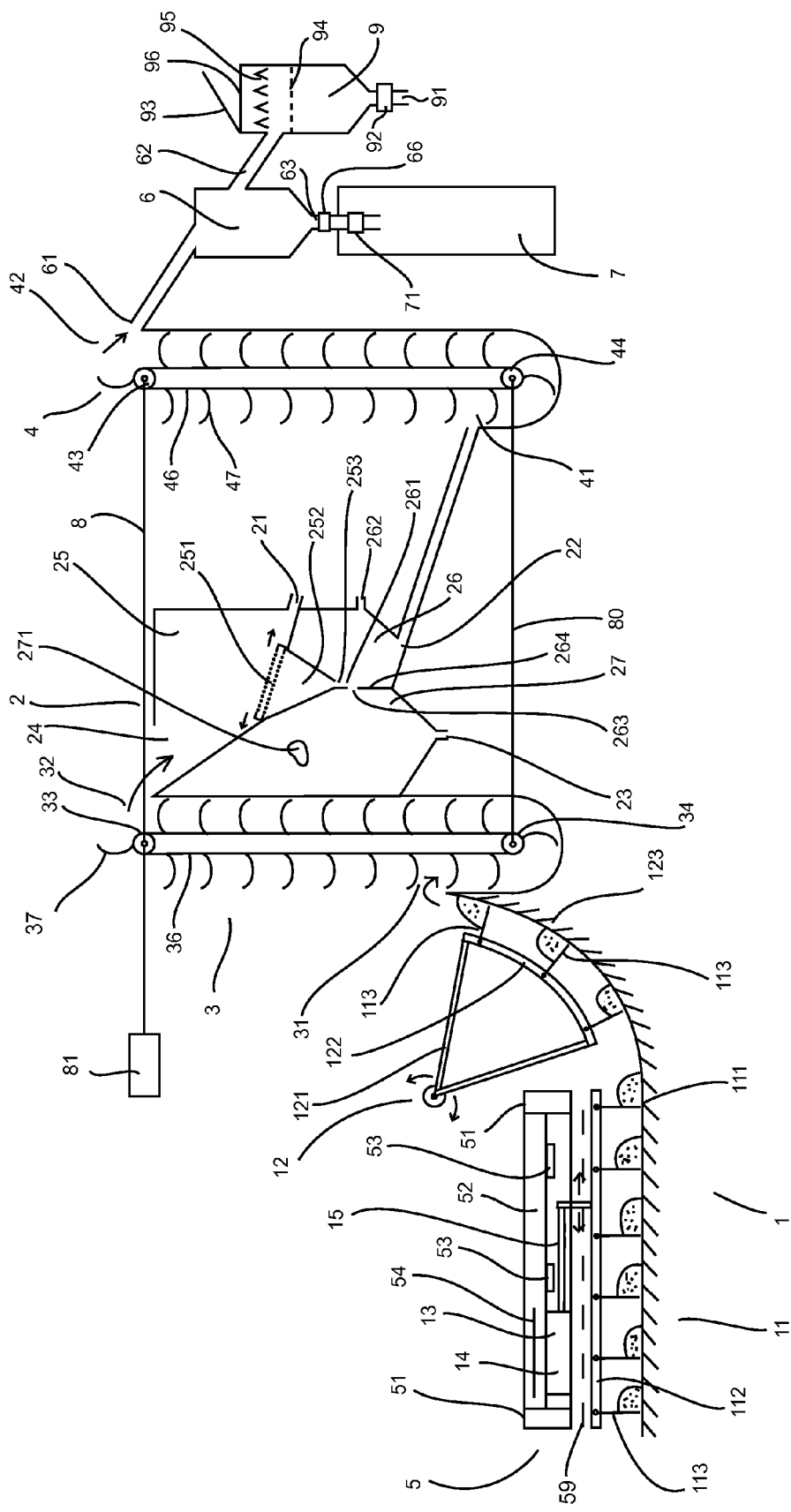
FIG. 1 represents the schematic layout of the apparatus according to example 1.

The apparatus of this example is intended for the collection, cleaning and storage of loose material, in this case abrasive materials used for cleaning steel castings by blasting. Referring to FIG. 1, the apparatus consists of a rake conveyor 1, for the collection of abrasives, the first bucket conveyor 3, the equipment 2 for sorting loose materials, a second bucket conveyor 4, a silo 6 and a container 9. Rake conveyor 1 has a horizontal sliding part 11 and a rotating-swinging part 12, whereas the horizontal sliding part 11 is located under floor 5 of the workplace. Floor 5 of the workplace is composed of covering frame 51 in which grates 52 are located and supported by stiffening ribs 53. Between horizontal moveable part 11 of the rake conveyor 1 and grates 52 is screen 59 made of wire screen, expanded metal or perforated sheet metal. The horizontal moveable part 11 of rake conveyor 1 consists of the horizontal part of the base 111 and frame 112, to which the flights 113 are suspended. Frame 112 with flights 113 reciprocates over some wheels or rollers or movable laths, omitted for clarity in FIG. 1. Frame 112 of horizontally movable part 11 of rack conveyor 1 has a linear drive 13 arranged under grates 52; the linear drive 13 has a fixed part 14 connected to covering frame 51, and its movable part 15 is connected to frame 112 of the horizontally movable part 11 of rake conveyor 1. The rotating-swinging part 12 is fitted tightly to the outlet side of the horizontally movable part 11 of rake conveyor 1. Rotating-swinging part 12 of rack conveyor 1 is made of arm 121 with an arcuate shape; the flights 113 are attached to arcuate part 122. Base 111 under the rotating-swinging part 12 has the arcuate shape of segment 123 forming a cylindrical surface. The outlet side of the rotating-swinging part 12 of rake conveyor 1 leads to input 31 of the first bucket conveyor 3, which comprises a vertical belt 36, which further comprises buckets 37. Outlet 32 of the first bucket conveyor 3 leads to input 24 of the first chamber 25 of equipment 2 for sorting loose material. The first chamber 25 is divided by diagonal vibrating screen 251, which filters out coarse impurities. Located under vibrating screen 251 is hopper 252 equipped with a first slit 253, which represents entrance 261 into the second chamber 26. Entrance 261 into the second chamber 26 is located near wall 264, which is common to second and third chambers 26, 27. Under the lower end of inclined vibrating screen 251 is a first output 21 of the equipment 2 for sorting loose material. At the lower end of the second chamber 26 is a second output 22 of equipment 2 for sorting loose material. The second chamber 26 is in the sidewall, which is arranged opposite to wall 264 which is common for the second and third chambers 26, 27; this is equipped with input 262 for the intake of air externally brought from the ambient environment. Under the first slit 253 is second slit 263 which is located in wall 264 which is common for the second and third chambers 26, 27; this second slit 263 represents the input into the third chamber 27. The third chamber 27 is located below the other chambers and is equipped with a third output 23. The sidewall of the third chamber 27 features outlet 271 for air drawn externally, which is connected to an exhaust system, which is omitted for clarity from FIG. 1. The second output 22 leads into the input 41 of the second bucket conveyor 4, which comprises vertical belt 46, on which buckets 47 are arranged. It may be seen that the horizontal distance from the first bucket conveyor 3 the second bucket conveyor 4 is relatively small. Driving wheel 33 of the first bucket conveyor 3 and driving wheel 43 of the second bucket conveyor 4 are arranged on a common driving shaft 8 connected to motor 81. The driven wheels 34, 44 of the first and second bucket conveyors 3, 4 are arranged on a common driven shaft 80. Outlet 42 of the second bucket conveyor 4 is connected to the first input 61 of silo 6. Silo 6 is further equipped with a second outlet 63 connected through outlet valve 66 to the input of pressure blasting equipment 7, which is equipped with pressure valve 71. Silo 6 is also equipped with outlet mouth 62 leading into container 9, which is an integral part of the apparatus. Container 9 is also equipped with outlet 91, which leads (by a configuration not apparent in FIG. 1) to input 31 of the first conveyor 3, and with a filling hole 96 covered by lid 93. Downstream from the outlet mouth 62, the screen 94 is located inside the container 9, and a toothed spur 95 is located above outlet mouth 62 for easier filling of the abrasives from bags.

The apparatus under this example works as follows: the surface of a metal casting is cleaned by blasting by abrasives using pressure blasting equipment. The used abrasive material falls onto floor 5 of the workplace together with the released iron scales and other impurities, where it falls through the holes in grates 52. Particles of the removed impurities and the used abrasives are deposited at the horizontal part of base 111 of rake conveyor 1 and are transported gradually over the surface of the base 111 by the reciprocating movement of flights 113 towards the cylindrical part of base 111, which is located under the rotating-swinging part 12 of rake conveyor 1. Arm 121 is in contact with frame 112 of the horizontal part of rake conveyor 1 and due to the reciprocal movement of the frame 112 it performs the reciprocal-swinging movement about its rotational axis. Flights 113 located at the circumference of the arcuate part 122 move the abrasives gradually over segment 123 of base cylindrical surface of the base 111, while the abrasive material moves upwards above input 31 of the first bucket conveyor 3. Through the first bucket conveyor 3, the mixture of used abrasives and impurities is transported to the first chamber 25 of equipment 2 for sorting loose material, and on inclined vibrating screen 251 the remaining coarse impurities are separated. The mixture that is now free of coarse impurities falls through the first slit 253 into the second chamber 26. During their free fall, the particles move along the second slit 263, through which the air drawn from the ambient environment reaches the third chamber 27 in a direction, which is perpendicular to the movement of the particles of the mixture. The smallest and lightest particles of the mixture are carried away on the air stream into the third chamber 27, where most of the particles are deposited due to decreased air velocity. The air is exhausted from the third chamber 27 through outlet 271. The abrasive material, now free of both coarse impurities and fine particles, is deposited in the second chamber 26, from which it is taken through second output 22 to input 41 of second bucket conveyor 4, which raises it to the first input 61 of silo 6. From silo 6, the cleaned abrasive material is taken out for the further use through its second output 63 and pressure valve 71 into pressure blasting equipment 7. Since pressure blasting equipment 7 works under pressure, the input of the pressure blasting equipment 7 is closed by pressure valve 71 during the operation. During uneven operation the abrasives can accumulate in silo 6. To avoid clogging of the second bucket conveyor 4 with the collected abrasives, silo 6 is equipped with outlet mouth 62, through which the excess abrasives falls into container 9. If the level of abrasives in the system with container 9 decreases, the required abrasive material fills up through valve 92 and through input 31 of first bucket conveyor 3 back to the system. Because the used abrasive material is depleted during operation, new abrasive material is added as necessary into container 9 through filling hole 96 after lid 93 has been raised. The machine operator adds new abrasives into container 9 as necessary.

Example 2

Figure 2:
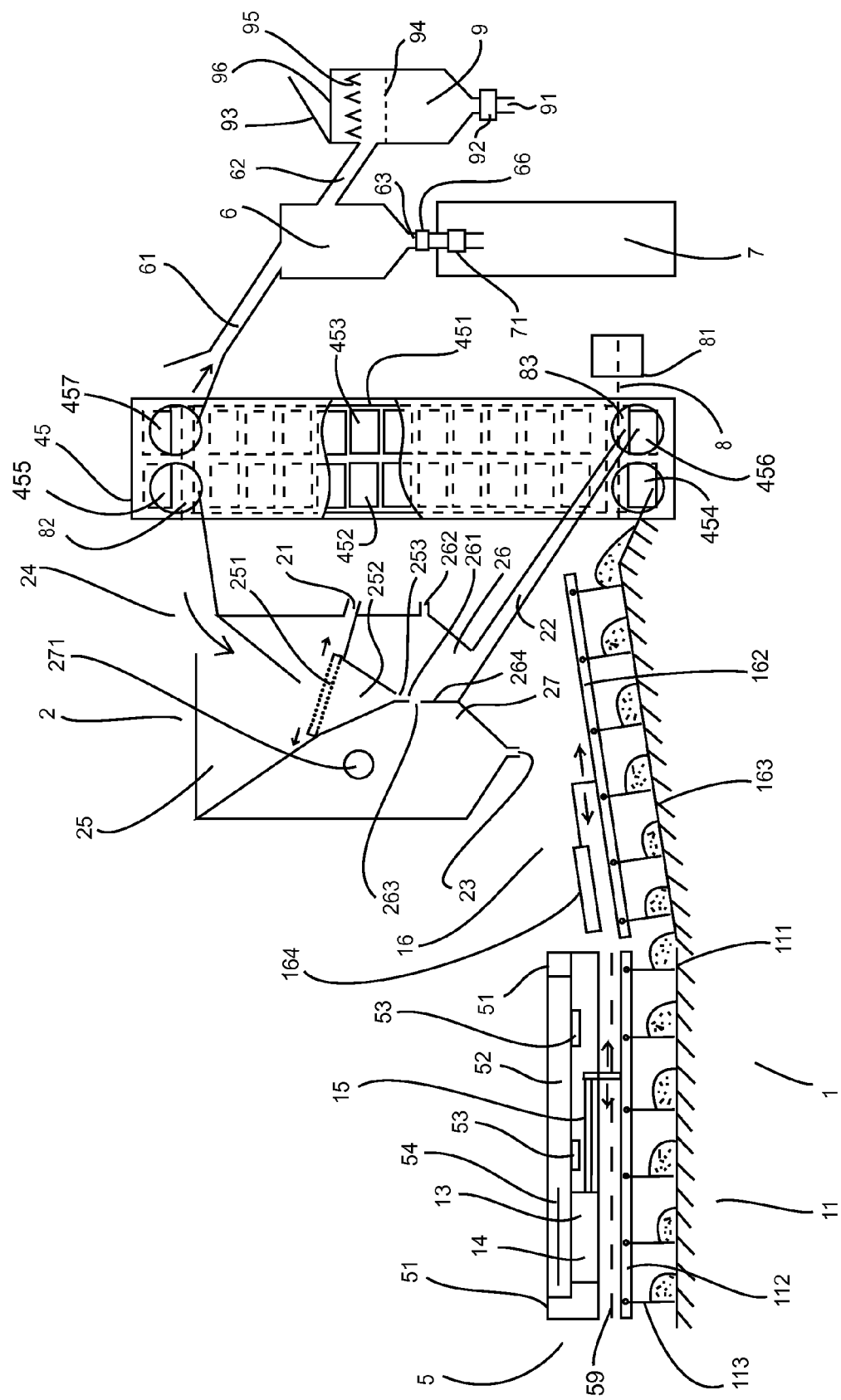
FIG. 2 shows the same according to example 2.

As will be discussed in some detail below, the apparatus of example 2 (shown in FIG. 2) differs from the apparatus described in example 1 (shown in FIG. 1) firstly by use of a inclined part 16 instead of rotating-swinging part 12, and secondly by use of dual bucket conveyor 45 which replaces the first bucket conveyor 3 and the second bucket conveyor 4 of example 1. Dual bucket conveyor 45 is equipped with a column of first buckets 452, and a parallel column of second buckets 453. The columns of buckets 452, 453 are parallel to each other and are located on one common belt 451. Base 111 of rake conveyor 1 creates inclined plane 163 at its inclined part 16. Above the inclined plane 163 is the reciprocating movable frame 162 of the inclined part 16 of the rake conveyor 1. Frame 162 carries flights 113 and is connected with linear drive 164 of inclined part 16. The output end of inclined part 16 of bucket conveyor 1 leads into the first input 454 of the dual bucket conveyor 45, which represents input 454 into the first part of the dual bucket conveyor 45, which involves the column of the first buckets 452. The first outlet 455 of dual bucket conveyor 45 leads to input 24 of the first chamber 25 of equipment 2 for sorting of loose material. The first chamber 25 is divided by diagonal vibrating screen 251, which filters out coarse impurities much as was described above in connection with example 1. Under inclined vibrating screen 251 is hopper 252 equipped with a first slit 253, which represents an entrance 261 into the second chamber 26. The entrance 261 into the second chamber 26 is located close to wall 264, which is common to the second and third chambers 26, 27. Under the level of the lowest end of the inclined vibrating screen 251 is the first outlet 21. At the lowest end of second chamber 26 is second output 22. The second chamber 26 is in the sidewall, which is arranged opposite to wall 264 which is common to the second and third chambers 26, 27, and this is equipped with input 262 for the intake of air brought externally from the ambient environment. Under the first slit 253 is second slit 263, which is located in wall 264 which is common to the second and third chambers 26, 27; this second slit 263 represents the input into the third chamber 27. The third chamber 27 is located lower than the other chambers and is equipped with third output 23. The side wall of third chamber 27 features air outlet 271, which is connected to an exhaust system omitted for clarity in FIG. 2. The second output 22 of equipment 2 leads into the input 456 of the second part of dual bucket conveyor 45, which involves the column of the second buckets 453 and is equipped with second outlet 457 of the second bucket conveyor. Both rows of buckets 452, 453 are located on vertically oriented common belt 451 of dual bucket conveyor 45. The common belt 451 is girded around the driven cylinder 82 and around the driving cylinder 83, which is connected to motor 81 through shaft 8. The second outlet 457 of the dual bucket conveyor 45 is connected to the first input 61 of silo 6. Silo 6 is arranged identically, as was described in example 1.

The apparatus under example 2 works in the same way as the apparatus, described in example 1, with the only difference being that the abrasive material from outlet 91 of container 9 is diverted (by a configuration not apparent from FIG. 2) above the inclined part 16 of rake conveyor 1, to which it falls freely and is mixed with the abrasive material transported by horizontal moveable part 11 of bucket conveyor 1.

Example 3

The apparatus of example 3 is much like that of the apparatus described in example 1, except that first and second bucket conveyors 3, 4 are replaced by dual bucket conveyor 45 as described in example 2.

Perspective Views

Figure 3:
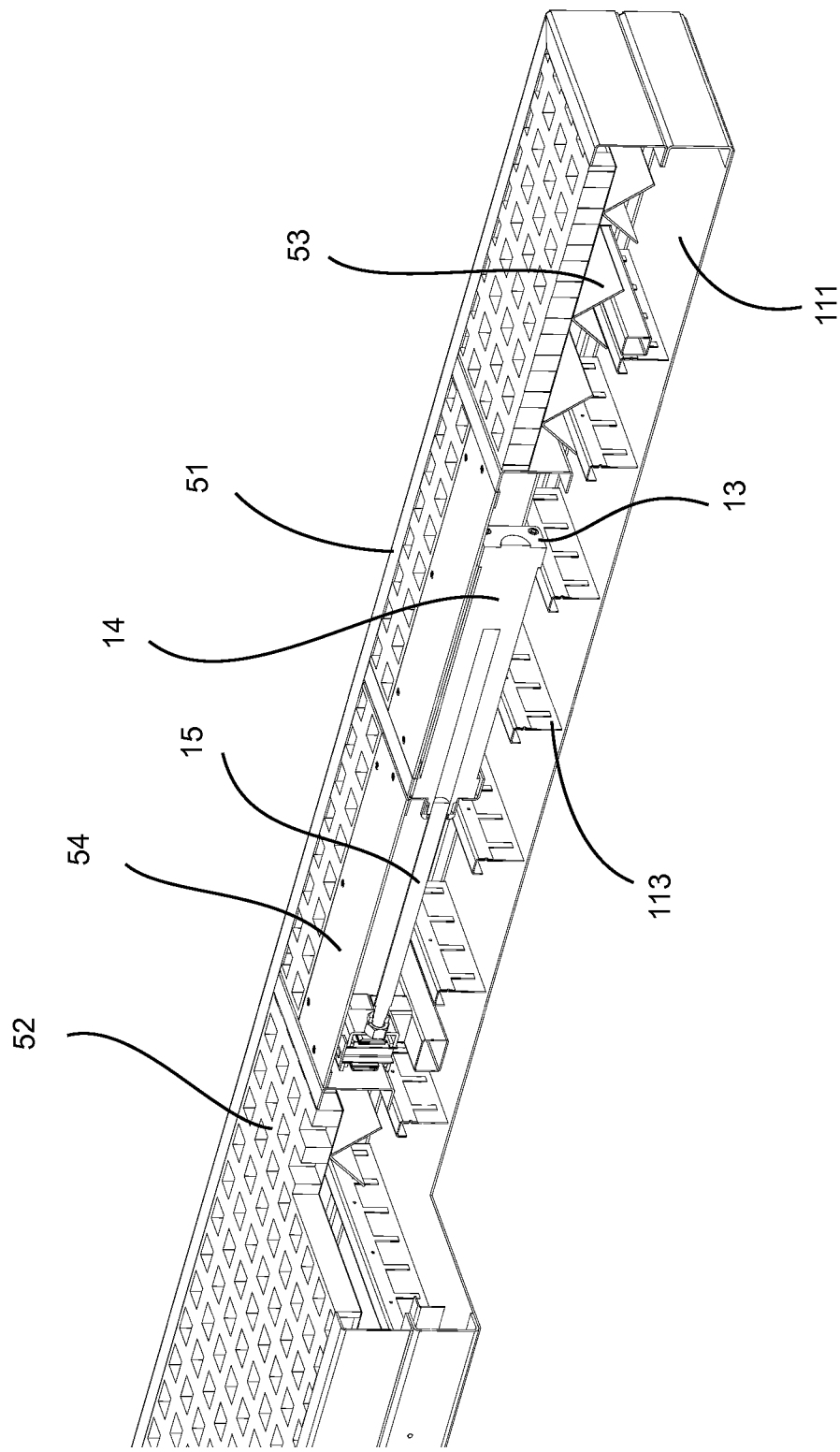
FIG. 3 represents part of one design of the workplace floor, among the other possible designs, as shown in any of the examples.

Turning to FIG. 3, what is seen in perspective view is is part of one design of the workplace floor, among the other possible designs, as shown in any of the examples. Grates 52 cover the floor of the workplace, supported by stiffening ribs 53. Linear drive 13 may be seen, causing flights 113 to move back and forth along base 111. Covering frame 51 may likewise be seen. Panel 54 tends to divert falling loose material away from the moving part 15 of the linear drive 13.

Figure 4:
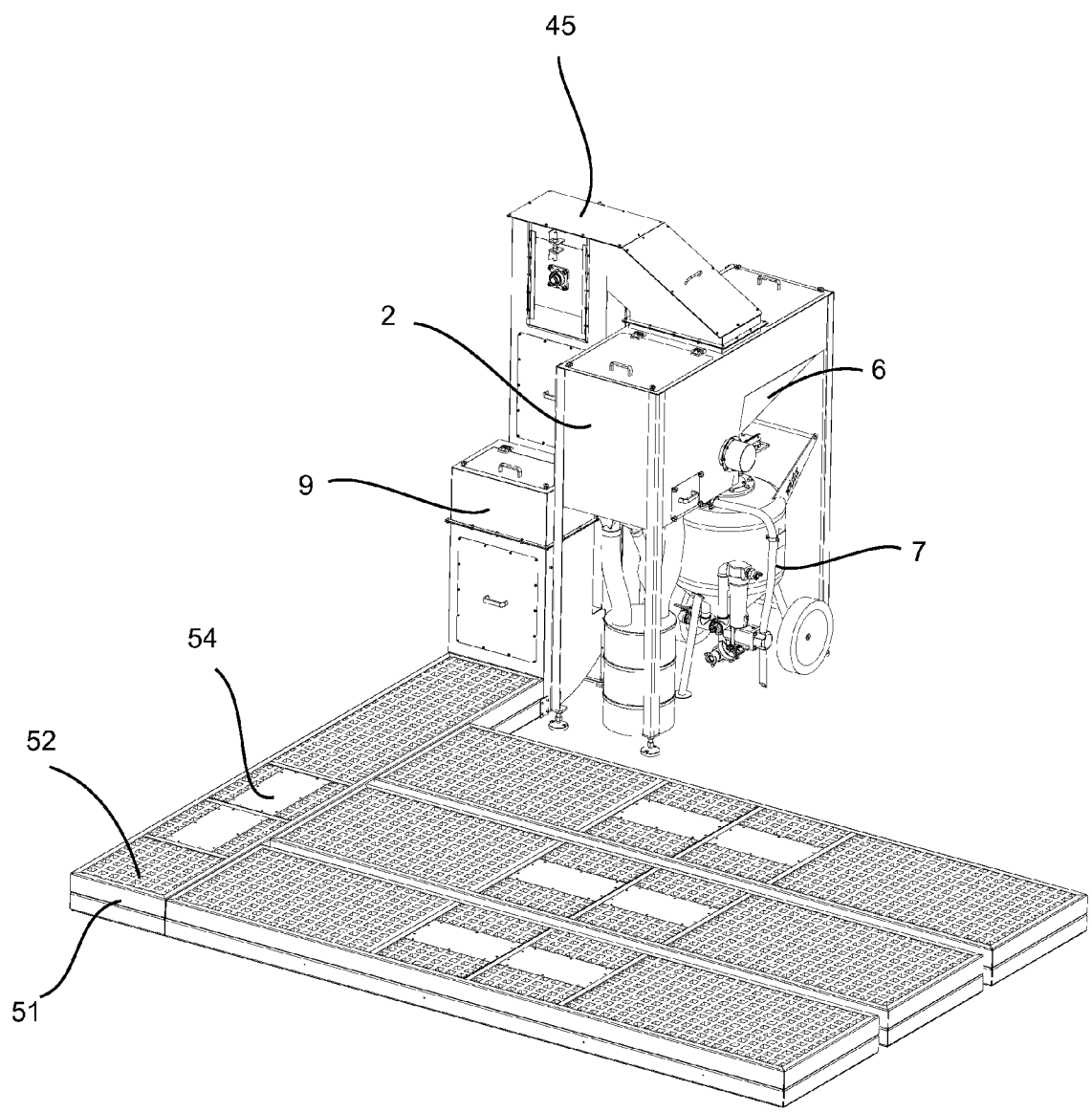
FIG. 4 represents a view of one possible design of the apparatus according the examples 2 and 3.

FIG. 4 represents a perspective view of one possible design of the apparatus according the examples 2 and 3. In this design there are three horizontal rakes which can collect the loose material and pass it to a fourth horizontal rake oriented at a right angle to the three previously mentioned rakes. The loose material is raked to one bucket train in the dual bucket conveyor 45, where it is lifted into the sorting equipment 2. The loose material may pass into silo 6 and from there to pressure blasting equipment 7. Some loose material may pass into container 9 for later feeding back into the flow path of the loose material. The pressure blasting equipment is employed to blast (for example) cast metal parts, to clean and/or grind the parts.

From this figure the alert reader may more fully appreciate the many benefits of the invention. The entire flow path of the loose material fits easily within a relatively small footprint, does not require excavation or installation of equipment below an existing floor, and does not stick up too high (and thus does not require a high ceiling).

Figure 5:
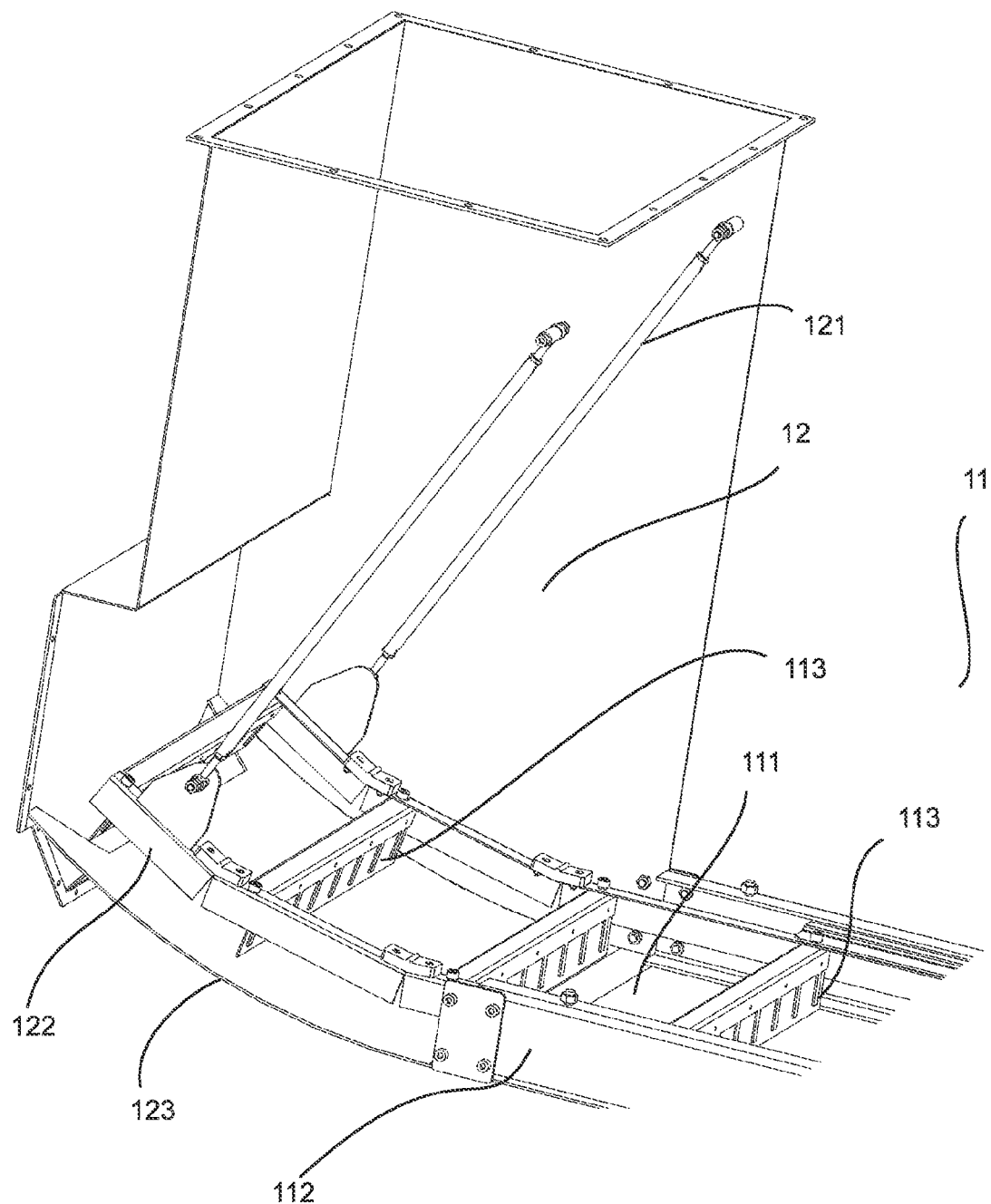
FIG. 5 represents a view of one possible design of the rotating-swinging part according to examples No. 1 and 3.

FIG. 5 represents a view of one possible design of the rotating-swinging part according to examples No. 1 and 3. The horizontal rake 11 reciprocates because of the previously mentioned linear drive, omitted for clarity in this figure. This horizontal rake propels the loose material generally leftwards in FIG. 5 (by comparison in FIG. 1 the loose material is propelled generally rightwards). The rotating-swinging part 12 may be seen, and it reciprocates as well, driven by the movement of the horizontal rake. The arcuate part 122 is supported by arms 121. Its flights 113 propel the loose material upward (to the left in the figure) and drop the loose material into buckets of the first bucket conveyor (omitted for clarity in this figure).

INDUSTRIAL APPLICABILITY

The apparatus according to this invention can be used for collecting and sorting loose materials such as abrasive grit and small balls, sorting grain from weeds and stones, sorting crushed stones into fractions, etc. Thanks to the modular design and small installation dimensions, the apparatus can be installed into transport containers, with the individual containers arranged into assemblies according to particular customer requirements and taking advantage of the described variable possibilities.

Table 1, which is part of the specification and which follows, provides in tabular form a list of reference numerals for the convenience reference of the reader.

TABLE 1

List of reference numerals
What follows for convenient reference is a list of reference numerals.

1 rake conveyer
  11 horizontal moveable part
    111 base
    112 frame
    113 flights
  12 rotating swinging part
    121 arm
    122 arcuate part
    123 segment of a cylindrical surface
  13 linear drive
    14 fixed part of linear drive
    15 moveable part of linear drive
  16 inclined part
    162 reciprocated moveable frame
    163 inclined plane
    164 linear drive of inclined part
2 equipment for sorting of loose material
  21 first output of equipment for sorting of loose material
  22 second output of equipment for sorting of loose material
  23 third output of equipment for sorting of loose material
  24 input of equipment for sorting of loose material
  25 first chamber
    251 inclined vibrating screen
    252 hopper
    253 first slit
  26 second chamber
    261 entrance into the second chamber
    262 input of . . .
    263 second slit
    264 wall
  27 third chamber
    271 outlet of third chamber
3 first bucket conveyor
  31 input of first bucket conveyor
  32 outlet of first bucket conveyor
  33 driving wheel of first bucket conveyor
  34 driven wheel of first bucket conveyor
  36 vertical belt
  37 buckets of first bucket conveyor
4 second bucket conveyor
  41 input of second bucket conveyor TABLE 1-continued List of reference numerals
What follows for convenient reference is a list of reference numerals.

42 outlet of second bucket conveyer
  43 driving wheel of second bucket conveyer
  44 driven wheel of second bucket conveyer
45 dual bucket conveyer
  451 common belt
  452 first buckets of dual bucket conveyer
  453 second buckets of dual bucket conveyer
  454 first input of dual bucket conveyer
  455 first outlet of dual bucket conveyer
  456 input of the second part of dual bucket conveyer
  457 second outlet of the second bucket conveyer
  46 vertical belt of dual bucket conveyer
  47 bucket of the second bucket conveyer
5 floor of the workplace
  51 covering frame
  52 grates
  53 stiffening ribs
  59 screen
6 silo
  61 first input of dual bucket conveyer
  62 outlet mouth
  63 second outlet of dual bucket conveyer
  66 outlet valve
7 pressure blasting equipment
  71 pressure valve
8 driving shaft
80 driven shaft
81 motor
82 driven cylinder
83 driving cylinder
9 container
  91 outlet of container
  92 valve
  93 lid
  94 screen of container
  95 toothed spur
  96 filling hole

The invention claimed is:

1. An apparatus for the transport and sorting of loose materials, comprising:
a rake conveyor with a horizontal moveable part, connected to a linear drive, and equipment for the sorting of loose material,
wherein the rake conveyor further comprises an additional rotating-swinging part and/or an inclined part,
the apparatus further comprising:
a first bucket conveyor, which is located between the rotating-swinging part and/or the inclined part of the rake conveyor and the equipment for sorting of loose material.

2. The apparatus of claim 1 wherein the equipment for sorting of loose material has a plurality of outputs, and wherein at least one of the outputs of the equipment for sorting of loose material is followed by a second bucket conveyor.

3. The apparatus of claim 2 wherein each of the first and second bucket conveyors has a respective driving wheel, and wherein the driving wheels of the first and second bucket conveyors are arranged on one common driving shaft.

4. The apparatus of claim 2 wherein the second bucket conveyor and the first bucket conveyor together comprise a dual bucket conveyor.

5. The apparatus of claim 4 wherein buckets of the dual bucket conveyor are arranged in two parallel rows on a common belt.

6. The apparatus of claim 4 further comprising a silo, wherein the dual bucket conveyor is equipped with an outlet for connecting to the silo.

7. The apparatus of claim 6 wherein the silo is located next to the equipment for sorting of loose material.

8. The apparatus of claim 6 further comprising a container, the dual conveyor having an input, the silo equipped with an outlet mouth leading into the container, the container having an outlet which leads into the input of the dual conveyor.

9. The apparatus of claim 2 further comprising a silo, wherein the second bucket conveyor is equipped with an outlet for connecting to the silo.

10. The apparatus of claim 9 wherein the silo is located next to the equipment for sorting of loose material.

11. The apparatus of claim 9 further comprising a container, the first bucket conveyor having an input, the silo equipped with an outlet mouth leading into the container, the container having an outlet which leads into the input of the first bucket conveyor.

12. The apparatus of claim 1 further comprising at least one screen located above at least a part of the rake conveyor.

13. The apparatus of claim 1 wherein the linear drive of the horizontal movable part of the rake conveyor is located above the horizontal movable part of the rake conveyor.

14. The apparatus of claim 1 further comprising a container, the container having an outlet which leads above the rake conveyor.

15. The apparatus of claim 1 further comprising a container, the container having an outlet which leads above the rotating-swinging part or above the inclined part.

16. A method for transport and sorting of loose materials, the method comprising the steps of:
    allowing the loose materials to fall onto a rake conveyor with a horizontal moveable part,
    driving the rake conveyor linearly, thereby conveying the loose materials,
    raking the loose materials, by means of an additional rotating-swinging part and/or an inclined part, to a first bucket conveyor,
    lifting the loose materials, by means of the first bucket conveyor, into equipment for sorting of the loose material, and
    sorting the loose material.

17. The method of claim 16 wherein the equipment for sorting of loose materials has a plurality of outputs, and wherein at least one of the outputs of the equipment for sorting of loose material is followed by a second bucket conveyor, the method further comprising:
    receiving loose materials from the equipment for sorting of loose material,
    passing the loose materials to the second bucket conveyor, and
    lifting the loose materials in the second bucket conveyor.

18. The method of claim 17 wherein the step of lifting the loose materials at the first bucket conveyor, and the step of lifting the loose materials at the second bucket conveyor, are each accomplished by driving the first and second bucket conveyors by means of one common driving shaft.

19. The method of claim 17 further comprising a step of loading the loose materials from an outlet of the second bucket conveyor into a silo.

20. The method of claim 19 wherein the silo is located next to the equipment for sorting of loose material.

21. The method of claim 19 further comprising the steps of:
    passing some of the loose materials from an outlet of the silo into a container, and
    passing some of the loose materials from an outlet of the container into the input of the first bucket conveyor.

* * * * *